Feb. 5, 1957 TOMAS HINOJOSA 2,780,692
FLUID LEVEL RESPONSIVE SWITCH
Filed Dec. 24, 1953
*Fig.1*
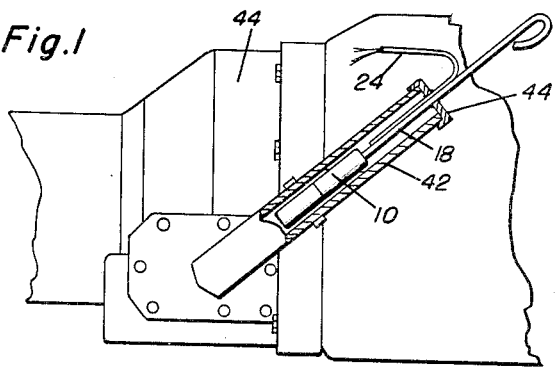
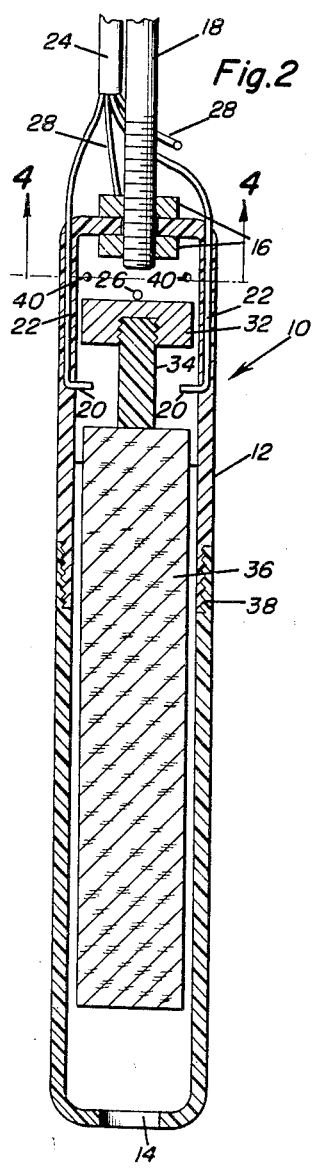
*Fig.2*
*Fig.3*
*Fig.4*
Tomas Hinojosa
INVENTOR.
BY *Clarence A. O'Brien
and Harvey B. Jacobson*
Attorneys

United States Patent Office 2,780,692
Patented Feb. 5, 1957

2,780,692
FLUID LEVEL RESPONSIVE SWITCH
Tomas Hinojosa, Laredo, Tex.
Application December 24, 1953, Serial No. 400,281
1 Claim. (Cl. 200—84)

This invention relates to new and useful improvements and structural refinements in fluid level responsive switches, and the principal object of the invention is to provide a switch of the character herein described, which may be conveniently and effectively employed in association with crank cases of engines or with hydraulic transmissions of automobiles, for the purpose of coacting with a suitable electrical system to indicate to the vehicle operator that the fluid level in the crank case or in the hydraulic transmission, as the case may be, has dropped to a dangerous level.

An important feature of the invention resides in the provision of a switch having two sets of electrical contacts, one set for the low side and one set for the high side, whereby one circuit may be energized through the switch to indicate to the operator that the fluid level is at normal, while the second set of contacts may be employed in conjunction with a separate circuit to indicate that the fluid level has reached a dangerous minimum.

An important feature of the invention resides in the construction of the switch which is so arranged that it may be readily installed in place of or attached to a conventional dip stick.

Some of the advantages of the invention lie in simplicity of construction, in its efficient and dependable operation and in its adaptability to economical manufacture.

These together with other objects and advantages which will become subsequently apparent resides in the details of construction and operation as more fully hereinafter described and claimed, reference being had to the accompanying drawings forming a part hereof, wherein like numerals refer to like parts throughout, and in which:

Figure 1 is a fragmentary side elevational view illustrating diagrammatically a hydraulic transmission of an automotive vehicle and the invention in association therewith;

Figure 2 is a vertical sectional view of the switch per se;

Figure 3 is a vertical sectional view, similar to that shown in Figure 2, but illustrating the float in its lower position; and Figure 4 is a transverse sectional detail, taken substantially in the plane of the line 4—4 in Figure 2.

Referring now to the accompanying drawings in detail, the fluid level responsive switch is designated generally by the reference character 10 and embodies in its construction an elongated, cylindrical housing 12 provided in its lower end with an opening 14, while the upper end of the housing is secured by suitable nuts 16 to a dip stick 18, which will be clearly understood.

The upper end portion of the housing is provided with a pair of diametrically opposed contact elements 20 which are in circuit with suitable conductors 22 fitted in the lateral wall of the housing, the conductors 22, in turn, communicating with an electrical conduit 24.

A second pair of diametrically opposed contact elements 26 are provided in the upper portion of the housing 12 in upwardly spaced relation from the contact elements 20, and the elements 26 are in circuit with the wires 28 of the conduit 24 through the medium of conductors 30.

A disc shaped contact member 32 of metallic material is movable vertically between the sets of contact elements 20, 26, it being understood that the housing 12 is formed from insulating material so that the member 32 is not electrically engageable therewith.

The member 32 is provided with a downwardly projecting stem 34 and the latter is engageable with the upper end of a cylindrical float 36 which is movable upwardly and downwardly in the lower portion of the housing 12.

The housing 12 is preferably formed from two sections which are separably connected together by screw threads 38, so that the various components may be installed to the housing, as will be clearly understood.

It will be also observed that the upper end portion of the housing 12 is formed with a plurality of fluid passages 40 and when the invention is placed in use, the conductors 22 of the contact elements 20 are connected in series with a source of current, and with one signal lamp (not shown), while the conductors of the contact elements 26 are connected in series with the same source of current and a second signal lamp (not shown). Thus, separate circuits are provided, and when the device is installed in position, for example, in a filler tube 42 of the hydraulic transmission 44 as shown in Figure 1, hydraulic fluid when at proper level will sustain the float 36 in upwardly slid position so that it engages the stem 34 of the contact member 32 and causes the contact member to shift upwardly in the housing until the contact member electrically bridges to contact elements 26. This, in turn, will energize one signal lamp which is preferably a green color, so as to indicate to the operator of the vehicle that the oil level is normal. However, when the oil level drops to a dangerous point, the float 36 will descend in the housing 12, which will be accompanied by a corresponding descent of the contact member 32, so that the circuit between the contact elements 26 is broken and a circuit through the contact elements 20 is established. Accordingly, a second light, preferably red in color, will warn the operator of the vehicle that the oil is at a dangerous level. A closure 44 for the filler tube 42 is fixed at an intermediate point on the dip stick 18.

If desired, the conductors 28 may be connected to the ignition circuit of the engine rather than to a signal lamp, so that as long as the oil level is normal, the engine can operate. However, when the oil level drops, the operation of the engine wlil be automatically interrupted.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claim.

What is claimed as new is as follows:

A fluid level signal comprising, in combination, a filler tube open at its upper end, a dip stick insertable in said filler tube and including an elongated cylindrical housing on its lower end, a float actuated switch operable in said housing, and a closure fixed on the dip stick engageable with the open end of the filler tube for removably mounting said dip stick therein.

References Cited in the file of this patent

UNITED STATES PATENTS

| 309,425 | Wickersham | Dec. 16, 1884 |
| 566,612 | O'Connor et al. | Aug. 25, 1896 |
| 684,893 | Whitfield | Oct. 22, 1901 |
| 1,293,991 | Vandermyde | Feb. 11, 1919 |
| 1,744,289 | Walters | Jan. 21, 1930 |
| 2,103,941 | Franey | Dec. 28, 1937 |
| 2,539,604 | Woolley | Jan. 30, 1951 |

FOREIGN PATENTS

| 42,855 | Germany | Aug. 7, 1887 |